US011159472B2

(12) United States Patent
Drevö et al.

(10) Patent No.: US 11,159,472 B2
(45) Date of Patent: Oct. 26, 2021

(54) METHODS, CENTRAL UNIT AND DISTRIBUTED UNIT OF A RADIO NETWORK NODE, FOR HANDLING A MESSAGE FOR TRANSMISSION TO A WIRELESS DEVICE

(71) Applicant: Telefonaktiebolaget LM Ericsson (publ), Stockholm (SE)

(72) Inventors: Markus Drevö, Linköping (SE); Matteo Fiorani, Solna (SE); Luca Lunardi, Linköping (SE); Anders Malm, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 170 days.

(21) Appl. No.: 16/473,411

(22) PCT Filed: Apr. 1, 2019

(86) PCT No.: PCT/SE2019/050293

§ 371 (c)(1),
(2) Date: Jun. 25, 2019

(87) PCT Pub. No.: WO2019/194726

PCT Pub. Date: Oct. 10, 2019

(65) Prior Publication Data

US 2021/0126888 A1 Apr. 29, 2021

Related U.S. Application Data

(60) Provisional application No. 62/653,589, filed on Apr. 6, 2018.

(51) Int. Cl.

*H04W 4/00* (2018.01)
*H04L 12/58* (2006.01)
*H04W 4/12* (2009.01)

(52) U.S. Cl.

CPC .............. *H04L 51/30* (2013.01); *H04L 51/38* (2013.01); *H04W 4/12* (2013.01)

(58) Field of Classification Search

CPC ........... H04L 51/30; H04L 51/38; H04W 4/12
See application file for complete search history.

(56) References Cited

U.S. PATENT DOCUMENTS

2011/0026414 A1* 2/2011 Banerjee ............... H04L 1/1877 370/252
2018/0206173 A1* 7/2018 Virtej .................... H04L 45/121
(Continued)

FOREIGN PATENT DOCUMENTS

WO 2017010693 A1 1/2017

OTHER PUBLICATIONS

3GPP, "3rd Generation Partnership Project; Technical Specification Group Radio Access Network; NG Radio Access Network (NG-RAN); F1 interface user plane protocol (Release 15)", 3GPP TS 38.475 V0.1.1, Jun. 2017, pp. 1-14.
(Continued)

*Primary Examiner* — Khai M Nguyen
(74) *Attorney, Agent, or Firm* — Sage Patent Group

(57) ABSTRACT

Methods, central unit (200A) and distributed unit (200B) of a radio network node (200), for handling a message received from a core node (204) for transmission to a wireless device (202). An action is required by the radio network node if the message is not successfully delivered to the wireless device. The central unit (200A) sends the message and an associated identifier I_msg to the distributed unit (200B) and then receives feedback indicating whether the message has been successfully delivered to the wireless device or not. The central unit (200A) performs the required action if the feedback does not confirm delivery of the message to the
(Continued)

wireless device (202). The required action may include sending a non-delivery indication to the core node (204).

26 Claims, 7 Drawing Sheets

(56) References Cited

U.S. PATENT DOCUMENTS

| | | | | |
|---|---|---|---|---|
| 2018/0213579 | A1 | 7/2018 | Hong et al. | |
| 2019/0253945 | A1* | 8/2019 | Paladugu | H04W 76/27 |
| 2019/0387444 | A1* | 12/2019 | Byun | H04W 36/0072 |
| 2020/0221529 | A1* | 7/2020 | Park | H04W 80/02 |
| 2020/0396663 | A1* | 12/2020 | Byun | H04W 36/0083 |

OTHER PUBLICATIONS

3GPP, "3rd Generation Partnership Project; Technical Specification Group Radio Access Network; NG-RAN; Architecture description (Release 15)", 3GPP TS 38.401 V15.0.0, Dec. 2017, pp. 1-23.

3GPP, "3rd Generation Partnership Project; Technical Specification Group Radio Access Network; NG-RAN; Architecture description (Release 15)", 3GPP TS 38.401 V15.1.0, Mar. 2018, pp. 1-23.

3GPP, "3rd Generation Partnership Project; Technical Specification Group Radio Access Network; NG-RAN; Architecture description (Release 15)", Draft 3GPP TS 38.401 V15.1.0, Mar. 2018, pp. 1-23.

3GPP, "3rd Generation Partnership Project; Technical Specification Group Radio Access Network; NG-RAN; F1 application protocol (F1AP) (Release 15)", 3GPP TS 38.473 V15.1.1, Apr. 2018, pp. 1-106.

3GPP, "3rd Generation Partnership Project; Technical Specification Group Radio Access Network; NG-RAN; F1 application protocol (F1AP); (Release 15)", 3GPP TS 38.473 V15.0.0, Dec. 2017, pp. 1-90.

3GPP, "3rd Generation Partnership Project; Technical Specification Group Radio Access Network; NG-RAN; NG Application Protocol (NGAP) (Release 15)", 3GPP TS 38.413 V0.8.0, Apr. 2018, pp. 1-164.

3GPP, "3rd Generation Partnership Project; Technical Specification Group Radio Access Network; NG-RAN; NG Application Protocol (NGAP) (Release 15)", 3GPP TS 38.413 V0.7.0, Mar. 2018, pp. 1-121.

3GPP, "3rd Generation Partnership Project; Technical Specification Group Radio Access Network; NR; NR and NG-RAN Overall Description; Stage 2 (Release 15)", 3GPP TS 38.300 V15.1.0, Mar. 2018, pp. 1-71.

3GPP, "3rd Generation Partnership Project; Technical Specification Group Radio Access Network; NR; NR and NG-RAN Overall Description; Stage 2 (Release 15)", 3GPP TS 38.300 V15.0.0, Dec. 2017, pp. 1-68.

3GPP, "3rd Generation Partnership Project; Technical Specification Group Radio Access Network; NR; Radio Link Control (RLC) protocol specification (Release 15)", 3GPP TS 38.322 V15.0.0, Dec. 2017, pp. 1-32.

3GPP, "3rd Generation Partnership Project; Technical Specification Group Services and System Aspects; Security architecture and procedures for 5G system (Release 15) (S3-182047)", 3GPP TS 33.501 V15.0.0, Mar. 2018, pp. 1-128.

Unknown, Author, "On capturing UP in a single spec", 3GPP TSG.RAN WG3 Meeting #97bis, R3-173955, Prague, Czech Republic, Oct. 9-13, 2017, pp. 1-6.

* cited by examiner

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| gNB-CU UE F1AP ID | M | | 9.3.1.4 | | YES | reject |
| gNB-DU UE F1AP ID | M | | 9.3.1.5 | | YES | reject |
| old gNB-DU UE F1AP ID | O | | 9.3.1.5 | Include it if RRCConnectionReestablishment is included in RRC-Container | YES | reject |
| SRB ID | M | | 9.3.1.7 | | YES | reject |
| RRC-Container | M | | 9.3.1.6 | | YES | reject |
| Message Identifier | O | | INTEGER(0..max | | YES | reject |

Fig. 4A

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| Message Identifer list | | 0..1 | | | YES | reject |
| > Message Identifier IEs | | 1... <maxnoofSRBs> | | | EACH | reject |
| >> Message Identifer | | | | The last successfully delivered message for the SRB | | |
| Cause | M | | 9.3.1.2 | | YES | ignore |

Fig. 4B

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| gNB-CU UE F1AP ID | M | | 9.3.1.4 | | YES | reject |
| gNB-DU UE F1AP ID | M | | 9.3.1.5 | | YES | reject |
| old gNB-DU UE F1AP ID | O | | 9.3.1.5 | Include it if RRCConnectionReestablishment is included in RRC-Container | YES | reject |
| SRB ID | M | | 9.3.1.7 | | YES | reject |
| RRC-Container | M | | 9.3.1.6 | | YES | reject |
| Decryption information | O | | | | YES | reject |
| > KEY | | | | | | |
| > COUNT | | | | | | |
| > BEARER | | | | | | |
| > LENGTH | | | | | | |

Fig. 4C

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| gNB-CU UE F1AP ID | M | | 9.3.1.4 | | YES | reject |
| gNB-DU UE F1AP ID | M | | 9.3.1.5 | | YES | reject |
| RRC-Container | M | | 9.3.1.6 | | YES | reject |
| Decryption information | O | | | | YES | reject |
| > KEY | | | | | | |
| > COUNT | | | | | | |
| > BEARER | | | | | | |
| > LENGTH | | | | | | |

Fig. 4D

METHODS, CENTRAL UNIT AND DISTRIBUTED UNIT OF A RADIO NETWORK NODE, FOR HANDLING A MESSAGE FOR TRANSMISSION TO A WIRELESS DEVICE

TECHNICAL FIELD

The present disclosure relates generally to a central unit and a distributed unit of a radio network node and methods therein, for handling a message from a core node for transmission from the distributed unit to a wireless device.

BACKGROUND

In this disclosure, the term "wireless device" is sometimes used to represent any communication entity capable of radio communication with a wireless network by sending and receiving radio signals, such as mobile telephones, tablets, laptop computers and Machine-to-Machine, M2M, devices, also known as Machine Type Communication, MTC, devices. Another common generic term in this field is "User Entity or Equipment, UE" which is also used herein as a synonym for wireless device.

Further, the term "radio network node", is used herein to represent any node of a wireless network that is configured to communicate radio signals with wireless devices. For example, the wireless network may be operating according to Long Term Evolution (LTE) or according to 5G, also referred to as "New Radio" (NR), both being defined by the third Generation Partnership Project, 3GPP. The radio network node may refer to a base station, eNB, gNB, ng-eNB, depending on the terminology used, although this disclosure is not limited to these examples. The node ng-eNB is defined for 5G in the 3GPP document TS38.300 section 3.

The radio network node is configured to transmit messages to wireless devices served by the radio network node, when said messages are received from a core node of a core network associated with the wireless network. Examples of such messages are Non Access Stratum (NAS) messages which are communicated between the core network and wireless devices according to a NAS protocol used in the core node and the respective wireless device. The radio network node may further employ a so-called split architecture by being divided into a central unit and one or more distributed units used for radio communication with wireless devices, and this split architecture is likely to be implemented in 5G and NR networks.

However, a problem with current solutions and procedures defined for the above split architecture may be that the central unit is not able to know if a particular message coming from a core node has been successfully delivered by the radio network node to a wireless device or not. This could be problematic particularly in case the message requires an action by the radio network node when not successfully delivered to the wireless device. If such a message has not been delivered to the device, unknowingly to the central unit, the action will not be performed as required.

SUMMARY

It is an object of embodiments described herein to address the problems and issues outlined above. It is possible to achieve this object and others by using a central unit of a radio network node, a distributed unit of the radio network node, and methods therein, as defined in the attached independent claims.

According to one aspect, a method is performed by a central unit of a radio network node, for handling a message received from a core node for transmission to a wireless device from a distributed unit of the radio network node. The message requires an action by the radio network node if the message is not successfully delivered to the wireless device.

In this method, the central unit sends the message and an associated identifier I_msg to the distributed unit, and receives feedback from the distributed unit indicating whether the message with said identifier I_msg has been successfully delivered to the wireless device or not. The central unit performs said required action if the feedback does not confirm delivery of the message to the wireless device. The central unit may in some cases perform some other action if the feedback confirms delivery of the message to the wireless device, such as sending another message to the device as triggered by the confirmed delivery.

According to another aspect, a central unit of a radio network node is arranged to handle a message received from a core node for transmission to a wireless device from a distributed unit of the radio network node. The message requires an action by the radio network node if the message is not successfully delivered to the wireless device.

The central unit is configured to send the message and an associated identifier I_msg to the distributed unit, and to receive feedback from the distributed unit indicating whether the message with said identifier I_msg has been successfully delivered to the wireless device or not. The central unit is further configured to perform said required action if the feedback does not confirm delivery of the message to the wireless device.

According to another aspect, a method is performed by a distributed unit of a radio network node, for handling a message received by a central unit of the radio network node from a core node for transmission to a wireless device, the message requiring an action by the radio network node if the message is not successfully delivered to the wireless device.

In this method, the distributed unit receives the message and an identifier I_msg from the central unit, and transmits the message to the wireless device. The distributed unit further detects whether the message was successfully delivered to the wireless device or not, and sends feedback to the central unit indicating whether the message with said identifier I_msg has been successfully delivered to the wireless device or not. Thereby, the central unit is enabled to perform said required action if the feedback does not confirm successful delivery of the message to the wireless device.

According to another aspect, a distributed unit of a radio network node is arranged to handle a message received by a central unit of the radio network node from a core node for transmission to a wireless device, the message requiring an action by the radio network node if the message is not successfully delivered to the wireless device.

The distributed unit is configured to receive the message and an associated identifier I_msg from the central unit, and to transmit the message to the wireless device. The distributed unit is also configured to detect whether the message was successfully delivered to the wireless device or not, and to send feedback to the central unit indicating whether the message with said identifier I_msg has been successfully delivered to the wireless device or no, thereby enabling the central unit to perform said required action if the feedback does not confirm successful delivery of the message to the wireless device.

When using one or more of the above methods and units, it is an advantage that the central unit will be aware of which messages have been delivered and which have not, and that the central unit is able to fulfil the requirement to perform the action if the message is not successfully delivered to the wireless device, e.g. to send a non-delivery indication to the core node 204 for that message. Since the central unit will also be aware of which messages have been successfully delivered as well, it is a further advantage that such a delivery could also trigger some other action by the radio network node such as sending another message.

The above methods, central unit and distributed unit may be configured and implemented according to different optional embodiments to ensure the above advantages and/or to accomplish further features and benefits, to be described below.

A computer program is also provided comprising instructions which, when executed on at least one processor in either of the above central unit and distributed unit, cause the at least one processor to carry out either of the methods described above. A carrier is also provided which contains the above computer program, wherein the carrier is one of an electronic signal, an optical signal, a radio signal, or a computer readable storage medium. It should be noted that the above processor may also be referred to as a processing circuitry which is basically a synonym for processor. Throughout this description, the term processor could thus be substituted by "processing circuitry".

BRIEF DESCRIPTION OF DRAWINGS

The solution will now be described in more detail by means of exemplary embodiments and with reference to the accompanying drawings, in which:

FIGS. 4A-D illustrate some examples of how an Information Element IE for an identifier I_msg could be added to the standard as specified in 3GPP document TS38.473 version 15.0.0, according to further example embodiments.

DETAILED DESCRIPTION

The Access & Mobility Management Function, AMF, will be used in this disclosure as a non-limiting example of a core node which typically communicates NAS messages with wireless devices. However, the examples described herein may be used for handling transmission of a message to a wireless device which message could come from any core node not limited to the AMF and not limited to a NAS message. For example, this message could be any of the following messages mentioned in the 3GPP document TS38.413:

UE context release command: A message coordinated to be sent after any NAS message received in the downlink NAS Transport message to avoid releasing the UE in case there are remaining NAS Messages in queue to be sent to the UE.

Protocol Data Unit (PDU) Session Setup: PDU Session level NAS messages must be sent to the UE after any NAS message previously communicated in a Downlink NAS Transport message.

The radio network node in this disclosure employs a so-called split architecture and is thus divided into a central unit and one or more distributed units. Throughout this description, only one distributed unit will be discussed for simplicity but one skilled in the art will appreciate that a radio network node with split architecture could comprise any number of distributed units. The term "gNB" is sometimes used herein as an example of such a radio network node of a 5G network, also referred to as a New Radio (NR) network. A radio network node in such a 5G network is sometimes also referred to as an "ng-RAN node" or "ng-eNB". The gNB described herein as an example of a radio network node could thus also be applicable for either of the ng-eNB and the ng-RAN node.

Figure 1:
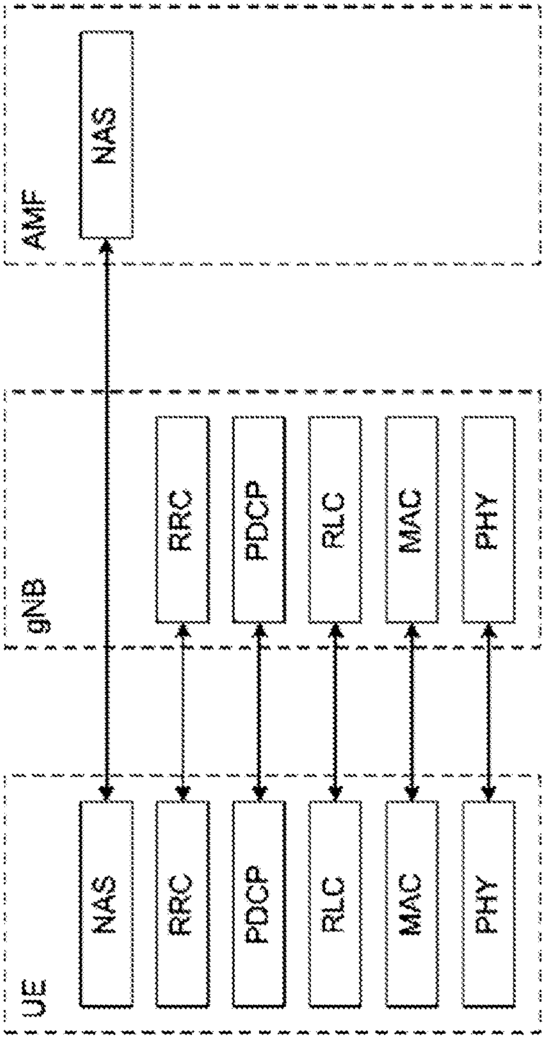
FIG. 1 illustrates protocol stacks employed in a wireless device UE, a radio network node gNB and in a core node AMF, according to the prior art.

In the 5G network, a split architecture is introduced where an ng-RAN node or gNB thus comprises a central unit (CU) and at least one distributed unit (DU), which are described in the 3GPP document TS38.401 version 15.0.0, section 6.1. The protocol stack employed in a wireless device (UE), a radio network node (gNB) and a core node (AMF) is shown in FIG. 1. In this description it is assumed that the radio network node, e.g. gNB, employs the above split architecture where the protocol stack between the gNB and UE is split into the DU and CU which are interconnected by an interface which in NR/5G is called F1-C and the application protocol is called F1AP, see the 3GPP document TS38.473 version 15.0.0.

Figure 2:
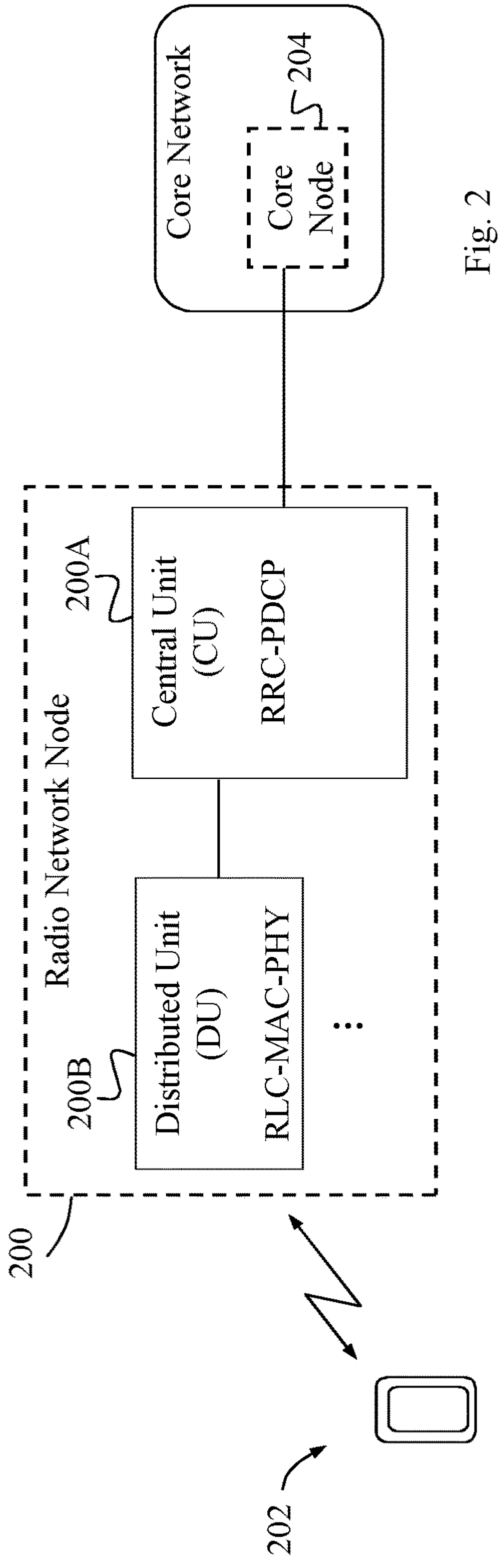
FIG. 2 illustrates a communication scenario involving a wireless device, a radio network node comprising a central unit and a distributed unit, and a core node of a core network.

A communication scenario where the solution could be employed is illustrated in FIG. 2 involving a wireless device 202 having a radio connection to a serving radio network node 200 comprising a central unit 200A and a distributed unit 200B which may be physically separated by any distance depending on the implementation. The wireless device 202 has a radio connection with the distributed unit 200B as indicated. Although only one distributed unit 200B is illustrated and discussed, the examples and embodiments herein are applicable for any number of distributed units, as schematically indicated by a dotted line in FIG. 2, which may be in radio communication with other UEs. In general, the central unit 200A may operate according to "higher layer" protocols and the distributed unit 200B may operate according to "lower layer" protocols. The central unit 200A is further connected to a core node 204 of a core network and is capable of receiving messages from the core node 204 for transmission to the wireless device 202 in the manner described herein. This basic scenario will be referenced in the examples below.

As can be seen in FIG. 2, the protocol stack may in a typical example be distributed in the CU and DU as:

Central unit (CU): RRC/Packet Data Convergence Protocol PDCP, which is an example of the above higher layer protocols.

Distributed unit (DU): RLC/MAC/PHY, which is an example of the above lower layer protocols.

According to the 3GPP document TS38.322 version 15.0.0. section 4.3.1, one of the services provided by RLC to higher layers is: “AM data transfer, including indication of successful delivery of upper layer Protocol Data Units PDUs”.

However, in a conventional distributed deployment of a radio network node, the DU, where the RLC is located, does not send acknowledgements to the CU, where upper or higher layers are located. Instead, the DU informs the upper layers in the CU only when there is some failure e.g. a radio link failure. However, there are messages which require specific actions when received from the AMF. One example of such messages is NAS messages which, according to the 3GPP document TS38.413 version 0.7.0, shall be treated according to the following requirement:

“When the NG-RAN node decides not to start the delivery of a NAS message that has been received over a UE-associated logical NG-connection or the NG-RAN node is unable to ensure that the message has been received by the UE, it shall report the non-delivery of this NAS message by sending a NAS NON DELIVERY INDICATION message to the AMF including the non-delivered NAS message within the NAS-PDU IE and an appropriate cause value within an appropriate Cause Information Element, IE”

Other examples of specific required actions may include:

Wait to release the UE until previously sent messages on a certain Signaling Radio Bearer SRB2 have been delivered to the UE.

Wait to send an RRCReconfiguration message according to 3GPP document TS38.331, containing NAS PDUs, until previously sent messages on SRB2 have been delivered to the UE.

In order to minimize latency, the messages are processed by the Packet Data Convergence Protocol PDCP before they are sent to the DU and over the interconnecting interface F1-C. In the DU the messages are queued before processed by the RLC layer. Already today the CU indicates to the DU which Signaling Radio Bearer (SRB) and UE each message (PDCP PDU) shall be sent on. When RLC has successfully sent one PDU, this is indicated to the DU and the next message, if any, in the queue for that UE and SRB is moved into the RLC entity for transmission.

A problem that may occur is that the gNB, or more specifically the CU, has no knowledge of which messages have been successfully delivered and which messages have not been successfully delivered, e.g. in case there is a radio link failure or a handover. Since the RRC message dlInformationTransfer does not have a response message, the RRC layer in the CU does not employ a timer for supervising this message.

Figure 3:
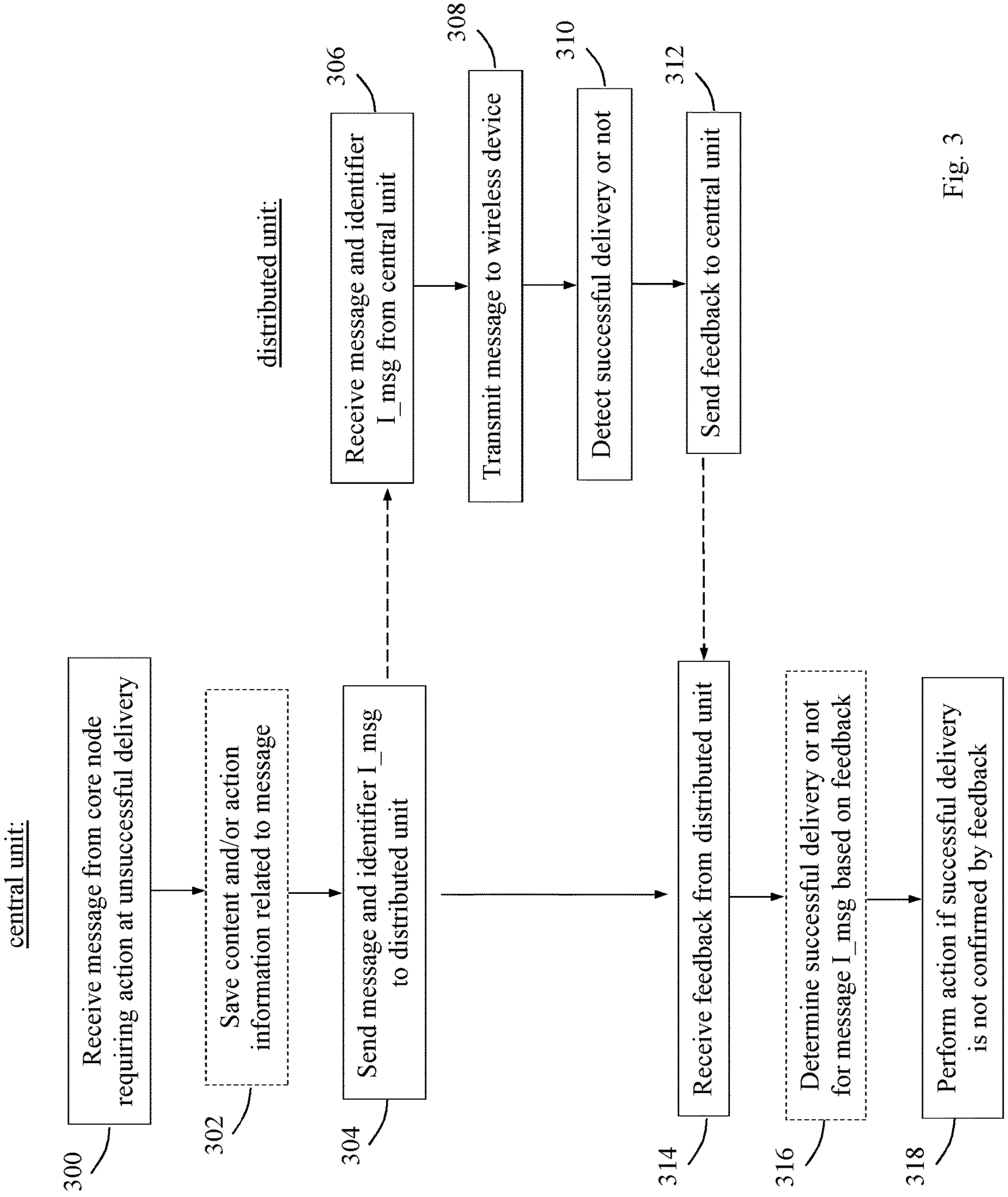
FIG. 3 is a flow chart illustrating procedures in a central unit of a radio network node and in a distributed unit of the radio network node, according to some example embodiments.

An example of how the solution may be employed in terms of actions or operations performed by a central unit 200A of a radio network node 200 and actions or operations performed by a distributed unit 200B of the radio network node 200, is illustrated by the flow chart in FIG. 3 which will now be described with further reference to FIG. 2. FIG. 3 thus illustrates jointly a procedure in the central unit 200A comprising the actions 300-304, 314-318 on the left hand side of the flow chart, and a procedure in the distributed unit 200B comprising the actions 306-312 on the right hand side of the flow chart. The actions in this figure could also be referred to as operations and should not be confused with the below-described “action” required by the radio network node when the message is not successfully delivered to the wireless device.

FIG. 3 thus illustrates a procedure in the central unit 200A for handling a message received from a core node 204 for transmission to a wireless device 202 from a distributed unit 200B of the radio network node, the message requiring an action by the radio network node if the message is not successfully delivered to the wireless device. This does not necessarily exclude that some other suitable action is performed by the radio network node also if the message is successfully delivered to the wireless device, which is however outside the scope of this example. The radio network node may thus perform some action when successful delivery is confirmed by feedback. Some optional example embodiments that could be used in this procedure will also be described.

FIG. 3 also illustrates a procedure in the network node 200 for handling a message received by a central unit 200A of the radio network node from a core node 204 for transmission to a wireless device 202, the message requiring an action by the radio network node if the message is not successfully delivered to the wireless device.

A first action 300 illustrates that the central unit 200A receives the message from the core node 204, which may be a NAS message although the solution is not limited thereto. Another action 302 illustrates that the central unit 200A may save content and/or action information related to the message, in a suitable storage or memory, so that this content/information can be retrieved later, e.g. depending on successful or unsuccessful delivery of the message.

In a next action 304, the central unit 200A sends the message and an associated identifier I_msg to the distributed unit 200B, which identifier I_msg has been assigned to be associated with this particular message which can thereby be identified by the identifier I_msg. The distributed unit 200B receives the message and its associated identifier I_msg from the central unit 200A, in another action 306. For example, presence of the identifier I_msg may be an indication that a delivery report is required for this message. In other examples, some other information element in the message or the type of the message itself may indicate that a delivery report is required. The solution is however not limited to any specific ways of indicating whether delivery of the message is required, i.e. ways to trigger a delivery report from the distributed unit 200B.

The distributed unit 200B then transmits the message to the wireless device 202, in another action 308. A next action 310 illustrates that the distributed unit 200B detects or determines whether the message was successfully delivered to the wireless device 202 or not. Successful delivery may be detected by receiving an acknowledgement or the like from the wireless device 202, while unsuccessful delivery may be detected when no such acknowledgement is received. Depending on implementation, the wireless device 202 may be configured to return an acknowledgement to its serving radio network node 200 for each message successfully received therefrom and absence of such an acknowledgement thus indicates unsuccessful delivery.

In a next action 312, the distributed unit 200B sends feedback to the central unit 200A, the feedback indicating whether the message with said identifier I_msg has been successfully delivered to the wireless device or not, thereby enabling the central unit to perform said required action if the feedback does not confirm successful delivery of the message to the wireless device. For example, the feedback may contain the identifier I_msg as an indication that the message associated with the identifier I_msg has been successfully delivered to the wireless device 202, or as an indication that successful delivery of the message with the identifier I_msg to the wireless device 202 has not been confirmed. In another example, the lack of identifier I_msg in the feedback may indicate that successful delivery has not been confirmed. There may thus be predefined rules or the like for how the feedback should be interpreted in terms of successful or unsuccessful delivery of the message with identifier I_msg.

In a next action 314, the central unit 200A receives said feedback from the distributed unit indicating whether the message with said identifier I_msg has been successfully delivered to the wireless device or not. In a next action 316, the central unit 200A may determine or identify successful delivery or not for the message with the associated identifier I_msg, based on the received feedback. A final action 318 illustrates that the central unit 200A will duly perform said required action if the feedback does not confirm delivery of the message to the wireless device. If the feedback indicates successful delivery, the required action will not be performed as of action 318. On the other hand, this does not exclude that some action other than the above-mentioned required action is performed when the feedback indicates successful delivery, which is however not illustrated in this figure.

It is thus an advantage that the central unit 200A will be aware of which messages have been delivered and which have not, and that the central unit 200A is able to fulfil a requirement for an action to be performed by the radio network node if the message is not successfully delivered to the wireless device, e.g. to send a non-delivery indication to the core node 204 for that message. Further, since the central unit is aware of which messages have been successfully delivered as well, such a delivery can also trigger some action by the radio network node such as sending another message.

Some example embodiments that could be used in the above procedure in the central unit 200A will now be described. In one example embodiment, the central unit 200A may save content of the message in a storage or memory before sending the message to the distributed unit 200B, as illustrated in action 302. The central unit 200A may then retrieve said content of the message from the storage or memory if the feedback received in action 314 does not confirm successful delivery of the message to the wireless device 202.

In another example embodiment, the central unit may instead receive content of the message as returned from the distributed unit, e.g. in the feedback received in action 314, in case the message has not been successfully delivered to the wireless device. In that case, another example embodiment may be that the central unit 200A saves information necessary for deciphering the message before sending the message to the distributed unit 200B in action 304, and uses the saved information for deciphering the returned content of the message.

In another example embodiment, said feedback received in action 314 may identify one or more messages that have been successfully delivered to the wireless device. In another example embodiment, said feedback may alternatively or additionally identify one or more messages that have not been successfully delivered to the wireless device. The feedback received in action 314 may thus contain either a "negative" indication for a non-delivered message or a "positive" indication for a delivered message, or the feedback may also contain both negative and positive indications for different messages.

In another example embodiment, the identifier I_msg may follow a predefined scheme such that the central unit 200A can determine delivery status of multiple forgoing messages with identifiers I_msg of said scheme, based on feedback received from the distributed unit indicating delivery to the wireless device of a message with the latest identifier I_msg in said scheme. A simple example is that the identifiers I_msg are assigned to successive messages in rising order, e.g. 1, 2, 3 . . . , up to a preconfigured maximum number and then the sequence is reused or "wrapped around". A more elaborate but predictable scheme may also be used and this embodiment is not limited to any particular scheme of identifiers I_msg.

In another example embodiment, the central unit 200A may save information related to said required action, as illustrated by action 302, and may then use the saved action information for performing the required action in case the feedback does not confirm delivery of the message to the wireless device.

In another example embodiment, said required action may include sending a non-delivery indication to the core node 204 which is thereby notified that the message is likely to not have been successfully delivered to the wireless device. For example, the central unit 200A may in this embodiment send a NAS Non delivery indication over the Next Generation Application Protocol (NGAP) to the core node 204.

Some example embodiments that could be used in the above procedure in the distributed unit 200B will now be described. In one example embodiment, the distributed unit 200B may return content of the message to the central unit 200A, e.g. in the feedback sent in action 312, when detecting that the message has not been successfully delivered to the wireless device 202.

In another example embodiment, said feedback sent in action 312 may identify one or more messages that have been successfully delivered to the wireless device. In another example embodiment, said feedback may identify one or more messages that have not been successfully delivered to the wireless device. These variants of feedback have been described above for the procedure in the central unit 200A.

Some further details, features and examples that could be used when the solution is employed, will now be described. The term UE is used below as a brief synonym for wireless device. Further, the brief terms DU and CU are used below for the distributed unit and the central unit, respectively.

For example, when the RRC layer sends a message to lower layers which message requires some action if not delivered to the UE, The CU may perform the following:

- Stores any content from the message which content needs some extra handling in case the message is not delivered together with the above-described identifier I_msg. In case the CU supports functionality such that the content marked for extra handling is different for different messages, the CU can also, in association to each I_msg, store information that indicates which action to take.
- Builds the RRC message and sends the message to lower layers which in this case is PDCP. The PDU delivered by PDCP is, together with the identifier I_msg and SRB ID, put into a F1 message, e.g. DL RRC message transfer, see the 3GPP document TS38.473 version 15.0.0.

When the message is received by the DU, it temporarily stores the I_msg which is known per UE and SRB and the corresponding PDCP PDU, if the message cannot be immediately processed by the corresponding RLC entity. If an event occurs which results in that all PDUs cannot be delivered to the UE, the DU reports to the CU the I_msg of those messages which have been delivered and/or the I_msg of those messages which have not been delivered, e.g. as described above for action 312. The CU then knows, due to the stored information, which action is required for each undelivered message and shall be performed.

In case the identifiers I_msg follow a scheme, e.g. implying that I_msg is a certain number and I_msg(n+1) is a number larger than I_msg(n), it is sufficient that the DU informs the CU about the last delivered I_msg for each bearer.

When the solution is used, one possible advantage is that the above-described requirement from the 3GPP document TS38.413 version 0.7.0 in a split architecture can be fulfilled.

Figure 5:
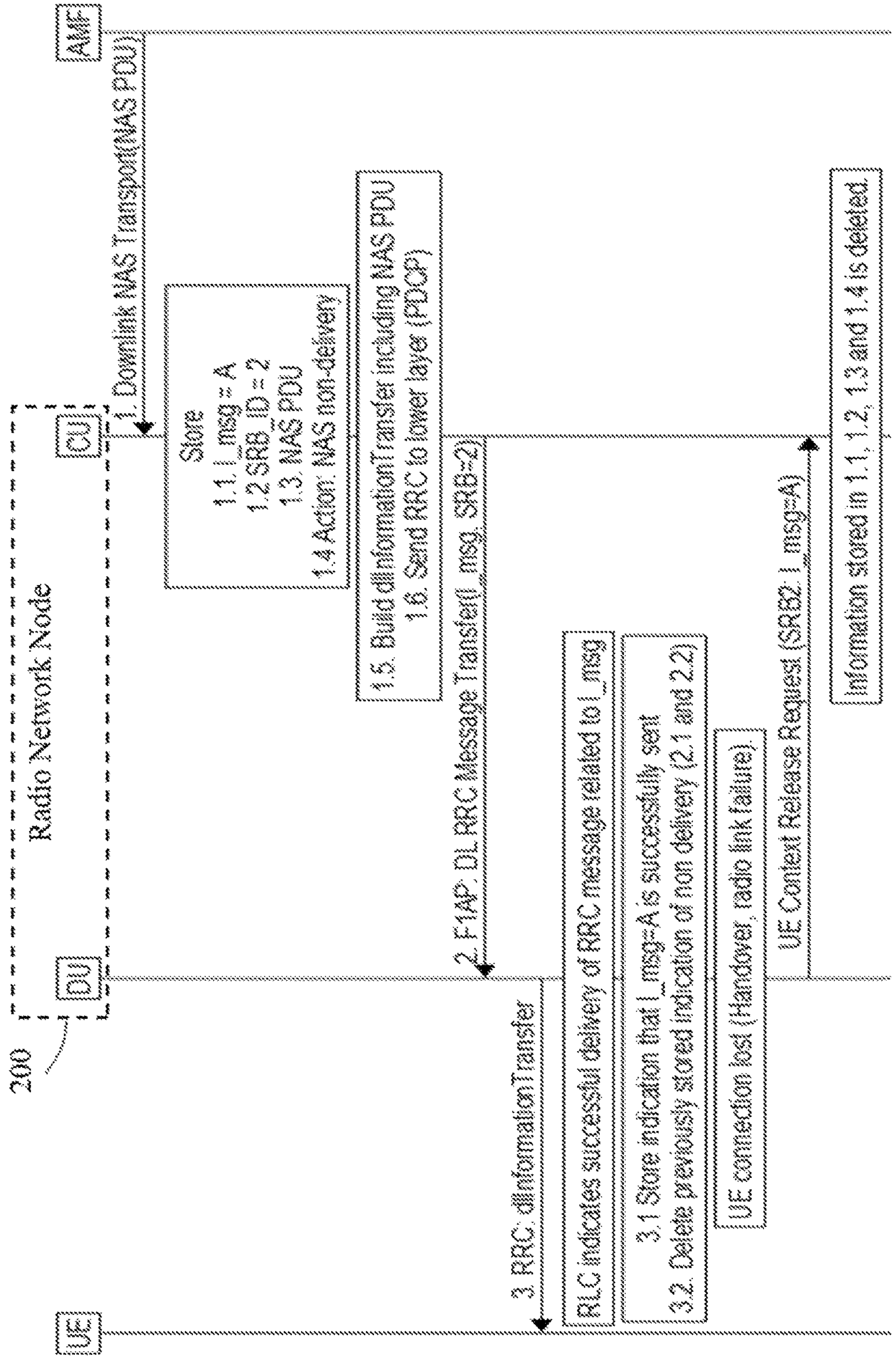
FIG. 5 is a signaling diagram illustrating an example of how a central unit CU and a distributed unit DU may operate when a message is successfully delivered to a UE, according to further possible embodiments.
Figure 6:
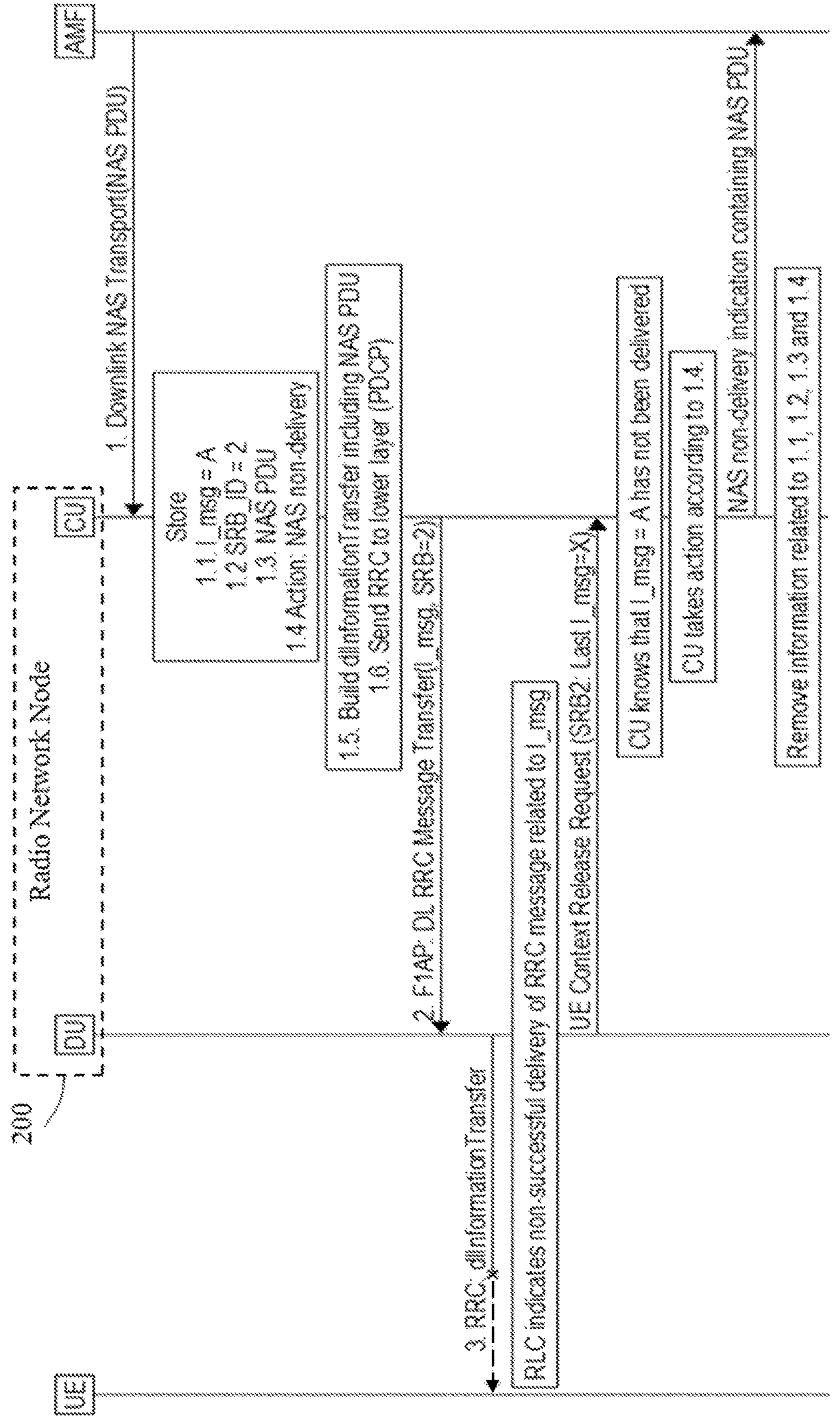
FIG. 6 is a signaling diagram illustrating another example of how the CU and the DU may operate when a message is not successfully delivered to the UE, according to further possible embodiments.

FIGS. 5 and 6 show two example signaling flows when a message such as a Downlink NAS TRANSPORT is received by the ng-RAN node (e.g. gNB), which will be described later below.

In order to enable the above-described examples and embodiments, the identifier I_msg could be added to the protocol used. The I_msg could be very generic and a simple way to implement it is as a positive integer value where every new assigned I_msg is larger than the previously assigned one, such as 1, 2, 3, etc. Since the messages are delivered in order per SRB, the CU then also knows that if it receives an indication that a particular I_msg has been successfully delivered, the CU knows that all previous messages sent on the same SRB have also been delivered to the UE.

Considering the existing version of the 3GPP document TS38.473 version 15.0.0, an Information Element IE for the identifier I_msg could be added according to the underlined text in any of FIGS. 4A-D. Max is a suitable max value of the IE, e.g. 2^10-1 which could be used to limit the amount of bits needed for the IE. The value could be selected as a tradeoff between wrapping around the max value and minimizing the cost of carrying the extra bits over the radio interface. The IE for the identifier I_msg may be optional in order to not mandate the mechanism in the cases when the CU does not need any feedback if the message was delivered or not for that particular message, that is when no action is required by the radio network node in case successful delivery of a message is not confirmed.

In order to handle the above-mentioned wrap-around of the values and also to delete stored information in the CU, it may be beneficial to introduce a mechanism where the CU can inquiry the DU which I_msgs were the last ones delivered per SRB.

As mentioned above, one alternative could be that the messages not delivered to the UE are reported instead from DU to CU, i.e. the non-delivered messages are explicitly indicated in the above-described feedback.

A slightly different variant of the solution is that instead of storing any message content information in the CU, such as the NAS PDU, the DU sends all the non-delivered PDCP PDUs back to the CU for further processing. This requires that the CU has stored the needed information to decipher the PDCP PDUS instead such as according to TS33.501 version 15.0.0, section D.2.2.1: "The input parameters to the ciphering algorithm are a 128-bit cipher key named KEY, a 32-bit COUNT, a 5-bit bearer identity BEARER, the 1-bit direction of the transmission i.e. DIRECTION, and the length of the keystream required i.e. LENGTH. The DIRECTION bit shall be 0 for uplink and 1 for downlink."

Yet another option would be to include all or some of the necessary information for deciphering the message together with the PDCP PDU when sent to the DU over the F1 interface. When the non-delivered information is returned to the CU this would then be easily accessible by the CU. For security reasons it may however not be needed to provide the cipher key since one implementation option could be to only keep that local and remember which key is used for which messages.

FIG. 4A illustrates a table where the solution could be implemented in a message "DL RRC MESSAGE TRANSFER" according to one variant. This message is sent by the gNB-CU to the gNB-DU to transfer the layer 3 message to the gNB-DU over the F1 interface, which may be utilized for performing actions 304-306. Modifications in the table of FIG. 4A are illustrated by underlined text in the table.

According to the F1AP specifications, the UE Context management messages (such as the UE Context Setup Request, the UE Context Modification Request and the UE Context Release Command) can be used to transfer RRC messages to the UE. Therefore, it is also required to add a similar IE as the one illustrated in the table of FIG. 6A in the UE Context management messages (such as the one mentioned above) to ensure that the proposed solution works correctly.

The release request message "UE CONTEXT RELEASE REQUEST" in the 3GPP document TS38.473 version 15.0.0 could be modified as shown in the table of FIG. 4B. This message is sent by the gNB-DU to the gNB-CU to request the gNB-CU to release the UE-associated logical F1, which may be utilized for performing actions 312-314. Modifications in the table of FIG. 4B are illustrated by underlined text in the table.

For the solution where the PDUs are delivered to the DU, the complete information which would be needed is illustrated in the message just below. However, several implementation options are possible and one option could be to only include the count value.

Another option could be to introduce a new DU-initiated class-2 procedure that is useful to: (1) inform the CU that an RRC message has not been delivered to the UE, e.g. by a notification to the CU including an appropriate cause-value, and (2) provide the latest delivered message per SRB to the CU. The CU can then decide which further action to take, e.g. remove the UE context or attempt a re-establishment procedure to re-establish connection with the UE.

In a different variant, the DU could report to the CU every time that an RRC message has been successfully acknowledged by the UE, which reporting may be done at the RLC layer. A mechanism similar to the one adopted over the user plane protocol for the purpose of flow control can be used. This variant has the advantage that the CU will have updated delivery information more or less in real-time when the UE has received an RRC message, which may be utilized in future signaling decisions, if any. On the other hand, such frequent reporting from DU to CU may increase the signaling load over the F1 interface which could be unfavorable. However, such an increased signaling load can be mitigated by the fact that the F1-C interface, if used, could be adapted to employ multiple SCTP associations for UE-associated signaling.

FIG. 4C illustrates a table where the solution could be implemented in the message "DL RRC MESSAGE TRANSFER" according to another variant. As said above, this message is sent by the gNB-CU to the gNB-DU to transfer the layer 3 message to the gNB-DU over the F1 interface, which may be utilized for performing actions 304-306. Modifications in the table of FIG. 4C are again illustrated by underlined text in the table.

To return non-delivered PDCP PDUs, a new message from the DU to the CU would be needed where the information necessary for deciphering is needed. The information which would need to be included is the information not stored in the CU. One implementation option corresponding to the example above is that only the count needs to be included.

FIG. 4D illustrates a table where the solution could be implemented in the message "DL RRC MESSAGE TRANSFER NON-DELIVERY" according to another variant. This message is also sent by the gNB-CU to the gNB-DU to transfer the layer 3 message to the gNB-DU over the F1 interface, which may be utilized for performing actions 304-306. Modifications in the table of FIG. 4D are again illustrated by underlined text in the table.

FIG. 5 illustrates a signaling flow where a message, in this case a Downlink NAS TRANSPORT, is received by the ng-RAN node (e.g. gNB) and when the message is successfully delivered to the UE. The above-described core node 204 is represented by the AMF and the above-described radio network node 200 comprises a DU and a CU as shown. This figure thus describes the successful case when the information, here included in the NAS PDU, is delivered to the UE. In this flow of FIG. 5, step 1 includes substeps 1.1-1.6 and step 3 includes substeps 3.1-3.2. Steps 1-3 are described below.

Step 1. The CU receives a NAS PDU in the downlink NAS transport message from the AMF. The NAS PDU shall be sent to the UE. The CU stores in a storage or memory the relevant information concerning the message which requires an action at non-delivery. An identifier I_msg (substep 1.1) is assigned and associated to the requested action which here is to deliver a NAS message. In case several SRBs are used an indication of which SRB is used may be stored (substep 1.2). If a NAS PDU cannot be delivered to the UE, the NAS PDU is stored by the CU in a memory. There is also an action stored indicative of what the CU should do if it becomes aware of that the NAS PDU is not delivered successfully to the UE (substep 1.4). For a NAS PDU received in a downlink NAS transport message, it would be to deliver the non-delivered NAS PDU to the core network using the NAS non-delivery procedure. The CU builds the RRC message which includes the NAS PDU (substep 1.5) and sends the message to lower layers which here is the PDCP.

Step 2. The F1AP used over F1-C is used to send the PDCP PDU generated in step 1 above together with the I_msg and SRB associated with the message. The DU stores the received information until the message is further processed by the DU.

Step 3. When the RLC entity for the indicated SRB in the DU is ready to process a new PDU, the PDCP PDU associated with the I_msg is delivered to that RLC entity. When the RLC entity indicates successfully delivery of the message, the DU stores an indication indicating that the information related to I_msg was successfully delivered to the UE for the selected SRB. When the UE is no longer connected to the ng-RAN node, e.g. due to handover or radio link failure, the DU indicates to the CU which I_msgs have been sent to the UE for each bearer. In this example, this is illustrated using the UE Context Release request message. Other messages may be used for other use cases such as UE Context Release Complete which then of course also need to contain the same information indicating which I_msgs have been sent for each bearer. When the CU receives the I_msg, in this example with information A, it understands that no further action is needed for the message indicated by identifier A.

FIG. 6 illustrates another signaling flow where the message described above for FIG. 4 is not successfully delivered to the UE. Again, the above-described core node 204 is represented by the AMF and the above-described radio network node 200 comprises a DU and a CU as shown. This figure thus describes what happens when the message would not be delivered successfully to the UE in step 3. Before step 3, steps 1-2 in FIG. 6 are identical to steps 1-2 in FIG. 5 and will not be described here again. In this example it is assumed that the previous delivered messages over SRB2 are indicated by I_msg=X.

Step 3. When the RLC indicates to the DU that the delivery of the message RRC: dlInformationTransfer to the UE has failed, the DU does not update the list of successfully delivered messages, hence the last delivered message I_msg is X which is previous to message A. When the DU sends the UE Context Release request to the CU, it includes I_msg=X. When the CU receives the message X, it knows that the message indicated by I_msg=A was not delivered to the UE. The CU looks up what action to perform when the message is not delivered, i.e. the required action described above, and finds that it is a NAS non delivery to be reported to the AMF. The CU then builds the NGAP message NAS non-delivery in which it includes the non-delivered NAS PDU from step 1.3. When the NAS non-delivery message has been sent, the stored information related to steps 1.1, 1.2, 1.3 and 1.4 is removed from the storage or memory.

The CU-DU split of a ng-RAN node such as an gNB may be subjected for cloud implementation. The CU could then be implemented in the cloud while the radio unit (DU) is located at a cell site or the like.

Among other things, it is an advantage that the solution can be used to fulfil the NAS non-delivery requirement. For example:

- The CU can be aware of which messages are successfully delivered to the UE when the UE disconnects from the ng-RAN node (e.g. handover, radio link failure, AMF initiated UE Context release).
- The mechanism enables the CU to store information for a subset of messages i.e. those which require some special action if not delivered to the UE. One such example is if a NAS PDU is not delivered and requires the NAS-non delivery procedure to be invoked.

Figure 7:
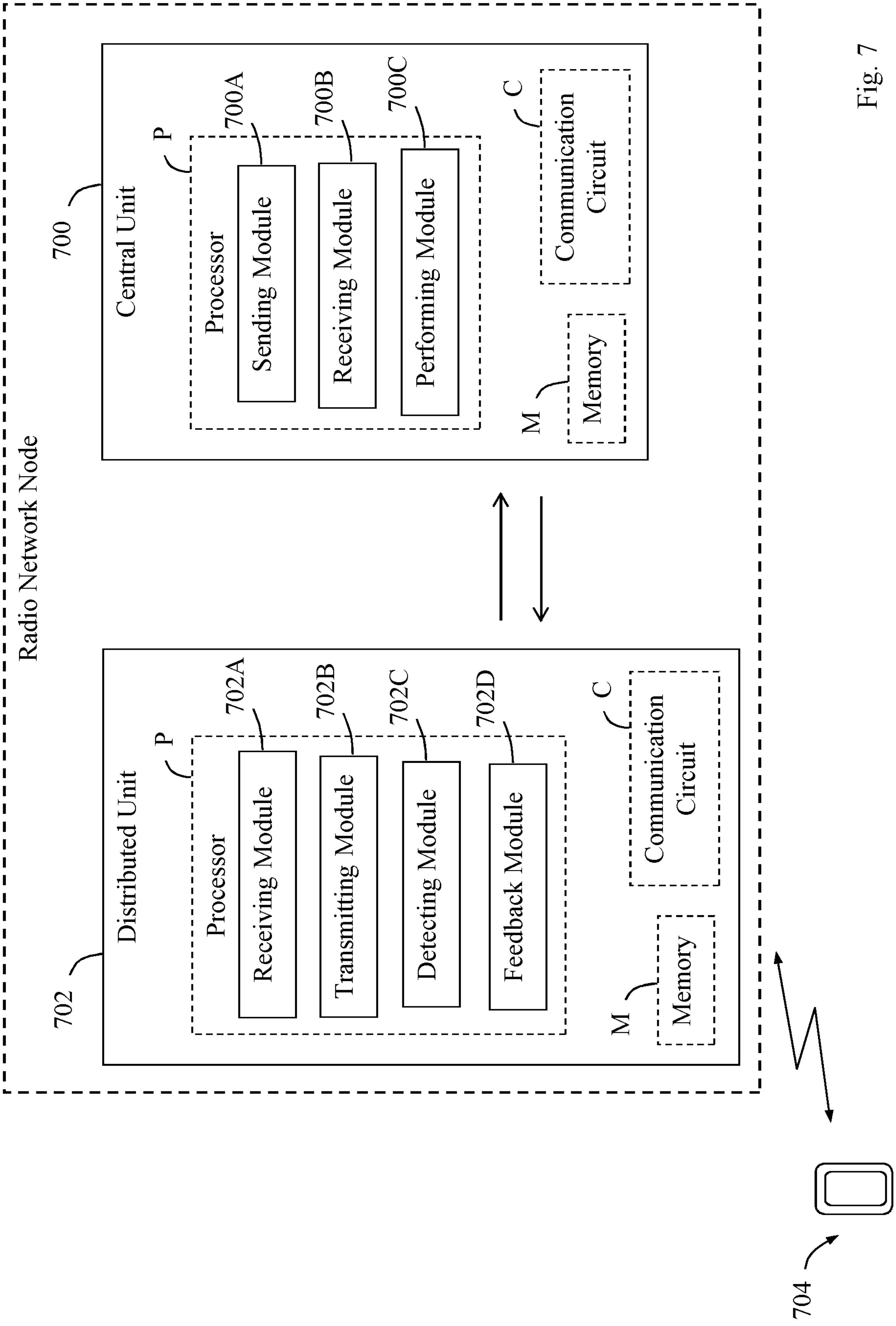
FIG. 7 is a block diagram illustrating how a central unit and a distributed unit may be structured, according to further example embodiments.

The block diagram in FIG. 7 illustrates a detailed but non-limiting example of how a central unit 700 and a distributed unit 702, respectively, may be structured to bring about the above-described solution and examples thereof. The central unit 700 and the distributed unit 702 are comprised in a radio network node in the manner described above for FIG. 2. The central unit 700 and the distributed unit 702 thus correspond to the central unit 200A and the distributed unit 200B, respectively, and they may be configured to operate according to any of the examples and embodiments of employing the solution as described herein, where appropriate.

Each of the central unit 700 and the distributed unit 702 is shown to comprise a processor "P", a memory "M" and a communication circuit "C" with suitable equipment for transmitting and receiving radio signals in the manner described herein.

The communication circuit C in each of the central unit 700 and the distributed unit 702 thus comprises equipment configured for communication with each other using a suitable protocol for the communication depending on the implementation. The solution is however not limited to any specific types of messages or protocols.

The central unit 700 is, e.g. by means of units, modules or the like, configured or arranged to perform at least some of the actions 300-304, 314-318 on the left hand side of the flow chart in FIG. 3 and as follows. Further, the distributed unit 702 is, e.g. by means of units, modules or the like, configured or arranged to perform the actions 306-312 on the right hand side of the flow chart in FIG. 3 and as follows.

The central unit 700 is arranged to handle a message received from a core node for transmission to a wireless device 704 from a distributed unit 702 of the radio network node, the message requiring an action by the radio network node if the message is not successfully delivered to the wireless device. As mentioned above, this action may include sending a non-delivery indication to the core node to report the lack of successful delivery.

The central unit 700 is configured to send the message and an associated identifier I_msg to the distributed unit 702. This operation may be performed by a sending module 700A in the central unit 700, as illustrated in action 304.

The central unit 700 is also configured to receive feedback from the distributed unit 702, the feedback indicating whether the message with said identifier I_msg has been successfully delivered to the wireless device or not. This receiving operation may be performed by a receiving module 700B in the central unit 700, as illustrated in action 314.

The central unit 700 is further configured to perform said required action if the feedback does not confirm delivery of the message to the wireless device 704, which may be performed by a performing module 700C in the central unit 700 as illustrated in action 318. The performing module 700C could alternatively be named an action module. As explained above, the feedback may in this case include the identifier I_msg to explicitly indicate that the message has not been delivered. Alternatively, the feedback may in this case omit the identifier I_msg which implicitly indicates that the message has not been delivered.

The distributed unit 702 is arranged to handle a message received by a central unit 700 of the radio network node from a core node for transmission to a wireless device 704, the message requiring an action by the radio network node if the message is not successfully delivered to the wireless device.

The distributed unit 702 is configured to receive from the central unit 700 the above message and an identifier I_msg associated with said message. This operation may be performed by a receiving module 702A in the distributed unit 702 as illustrated in action 306.

The distributed unit 702 is also configured to transmit the message to the wireless device 704, which may be performed by a transmitting module 702B in the distributed unit 702, as illustrated in action 308. The distributed unit 702 further saves the associated identifier I_msg until it is confirmed that the message has been successfully delivered to the wireless device 704.

The distributed unit 702 is further configured to detect whether the message was successfully delivered to the wireless device or not. This operation may be performed by a detecting module 702C in the distributed unit 702, as illustrated in action 310. The detecting module 702C could alternatively be named a logic module or a detecting module.

The distributed unit 702 is further configured to send feedback to the central unit, the feedback indicating whether the message with said identifier I_msg has been successfully delivered to the wireless device 704 or not, thereby enabling the central unit to perform said required action if the feedback does not confirm successful delivery of the message to the wireless device 704. This sending operation may be performed by a feedback module 702D in the distributed unit 702, as illustrated in action 406. The feedback module 702D could alternatively be named a reporting module or a sending module.

It should be noted that FIG. 7 illustrates various functional modules in the central unit 700 and the distributed unit 702, respectively, and the skilled person is able to implement these functional modules in practice using suitable software and hardware equipment. Thus, the solution is generally not limited to the shown structures of the central unit 700 and the distributed unit 702, and the functional modules therein may be configured to operate according to any of the features, examples and embodiments described in this disclosure, where appropriate.

The functional modules 700A-C and 702A-D described above may be implemented in the central unit 700 and the distributed unit 702, respectively, by means of program modules of a respective computer program comprising code means which, when run by the processor P causes the central unit 700 and the distributed unit 702 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the central unit 700 and the distributed unit 702 in the form of a memory having a computer readable medium and being connected to the processor P. The computer program product or memory M in each of the central unit 700 and the distributed unit 702 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative implementations be distributed on different computer program products in the form of memories within the respective central unit 700 and distributed unit 702.

The solution described herein may be implemented in each of the central unit 700 and the distributed unit 702 by a computer program comprising instructions which, when executed on at least one processor, cause the at least one processor to carry out the actions according to any of the above embodiments and examples, where appropriate. The solution may also be implemented at each of the central unit 700 and the distributed unit 702 in a carrier containing the above computer program, wherein the carrier is one of an electronic signal, optical signal, radio signal, or computer readable storage medium.

While the solution has been described with reference to specific examples, the description is generally only intended to illustrate the inventive concept and should not be taken as limiting the scope of the solution. For example, the terms "radio network node", "wireless device", "central unit", "distributed unit", "core node", "message", "feedback" and "required action" have been used throughout this disclosure, although any other corresponding entities, functions, and/or parameters could also be used having the features and characteristics described here. The solution may be implemented according to the appended statements which could also be referred to as embodiments.

ABBREVIATIONS

CU: Central Unit
DU: Distributed Unit
UE: User Entity
NAS: Non Access Stratum
PDU: Protocol Data Unit
ng-RAN: new generation Radio Access Network, see TS38.300 v15.0.0 section 4.1
gNB: See definition in TS38.300 v15.0.0 section 4.1
ng-eNB: See definition in TS38.300 v15.0.0 section 4.1

The invention claimed is:

1. A method performed by a central unit of a radio network node, for handling a message received from a core node for transmission to a wireless device from a distributed unit of the radio network node, the message requiring an action by the radio network node if the message is not successfully delivered to the wireless device, the method comprising:

- sending the message and an associated identifier that is separate from the message to the distributed unit,
- receiving feedback from the distributed unit indicating whether the message with said identifier has been successfully delivered to the wireless device or not, and
- performing said required action if the feedback does not confirm delivery of the message to the wireless device, wherein the required action to be performed is known due to the associated identifier.

2. The method of claim 1, wherein the central unit saves content of the message in a storage or memory before sending it to the distributed unit, and retrieves said content of the message from the storage or memory if the feedback does not confirm delivery of the message to the wireless device.

3. The method of claim 1, wherein the central unit receives content of the message as returned from the distributed unit in case the message has not been successfully delivered to the wireless device.

4. The method of claim 3, wherein the central unit saves information necessary for deciphering the message before sending it to the distributed unit and uses the saved information for deciphering the returned content of the message.

5. The method of claim 1, wherein said feedback identifies one or more messages that have been successfully delivered to the wireless device.

6. The method of claim 1, wherein said feedback identifies one or more messages that have not been successfully delivered to the wireless device.

7. The method of claim 1, wherein the identifier follows a predefined scheme such that the central unit can determine delivery status of multiple forgoing messages with identifiers of said scheme, based on feedback received from the distributed unit indicating delivery to the wireless device of a message with the latest identifier in said scheme.

8. The method of claim 1, wherein the central unit saves information related to said required action, and uses the saved information for performing the required action in case the feedback does not confirm delivery of the message to the wireless device.

9. The method of claim 1, wherein said required action includes sending a non-delivery indication to the core node.

10. A central unit of a radio network node, for handling a message received from a core node for transmission to a wireless device from a distributed unit of the radio network node, the message requiring an action by the radio network node if the message is not successfully delivered to the wireless device, the central unit comprising:

- a processor, and
- a memory operatively coupled to the processor and storing a computer program for execution by the processor, whereby the central unit is configured to:
  - send the message and an associated identifier that is separate from the message to the distributed unit,
  - receive feedback from the distributed unit indicating whether the message with said identifier has been successfully delivered to the wireless device or not, and
  - perform said required action if the feedback does not confirm delivery of the message to the wireless device, wherein the required action to be performed is known due to the associated identifier.

11. The central unit of claim 10, wherein the central unit is configured to save content of the message in a storage or memory before sending it to the distributed unit, and to retrieve said content of the message from the storage or memory if the feedback does not confirm delivery of the message to the wireless device.

12. The central unit of claim 10, wherein the central unit is configured to receive content of the message as returned from the distributed unit in case the message has not been successfully delivered to the wireless device.

13. The central unit of claim 12, wherein the central unit is configured to save information necessary for deciphering the message before sending it to the distributed unit, and to use the saved information for deciphering the returned content of the message.

14. The central unit of claim 10, wherein said feedback identifies one or more messages that have been successfully delivered to the wireless device.

15. The central unit of claim 10, wherein said feedback identifies one or more messages that have not been successfully delivered to the wireless device.

16. The central unit of claim 10, wherein the identifier follows a predefined scheme, and wherein the central unit is configured to determine delivery status of multiple forgoing messages with identifiers of said scheme, based on feedback received from the distributed unit indicating delivery to the wireless device of a message with the latest identifier in said scheme.

17. The central unit of claim 10, wherein the central unit is configured to save information related to said required action, and to use the saved information for performing the required action in case the feedback does not confirm delivery of the message to the wireless device.

18. The central unit of claim 10, wherein said required action includes sending a non-delivery indication to the core node.

19. A method performed by a distributed unit of a radio network node, for handling a message received by a central unit of the radio network node from a core node for transmission to a wireless device, the message requiring an action by the radio network node if the message is not successfully delivered to the wireless device, the method comprising:

- receiving the message and an identifier that is separate from the message from the central unit, transmitting the message to the wireless device, detecting whether the message was successfully delivered to the wireless device or not, and sending feedback to the central unit indicating whether the message associated with said identifier has been successfully delivered to the wireless device or not, thereby enabling the central unit to perform said required action if the feedback does not confirm successful delivery of the message to the wireless device, wherein the required action to be performed is known due to the associated identifier.

20. The method of claim 19, wherein the distributed unit returns content of the message to the central unit when detecting that the message has not been successfully delivered to the wireless device.

21. The method of claim 19, wherein said feedback identifies one or more messages that have been successfully delivered to the wireless device.

22. The method of claim 19, wherein said feedback identifies one or more messages that have not been successfully delivered to the wireless device.

23. A distributed unit of a radio network node, for handling a message received by a central unit of the radio network node from a core node for transmission to a wireless device, the message requiring an action by the radio network node if the message is not successfully delivered to the wireless device, the distributed unit comprising:

a processor, and a memory operatively coupled to the processor and storing a computer program for execution by the processor, whereby the central unit is configured to:

receive the message and an associated identifier that is separate from the message from the central unit, transmit the message to the wireless device, detect whether the message was successfully delivered to the wireless device or not, and send feedback to the central unit indicating whether the message associated with said identifier has been successfully delivered to the wireless device or not, thereby enabling the central unit to perform said required action if the feedback does not confirm successful delivery of the message to the wireless device, wherein the required action to be performed is known due to the stored associated identifier.

24. The distributed unit of claim 23, wherein the distributed unit is configured to return content of the message to the central unit when detecting that the message has not been successfully delivered to the wireless device.

25. The distributed unit of claim 23, wherein said feedback identifies one or more messages that have been successfully delivered to the wireless device.

26. The distributed unit of claim 23, wherein said feedback identifies one or more messages that have not been successfully delivered to the wireless device.

* * * * *